US007299484B2

United States Patent
Thompson

(10) Patent No.: US 7,299,484 B2
(45) Date of Patent: Nov. 20, 2007

(54) METHOD AND APPARATUS FOR ADAPTIVE CHANNEL SELECTION

(75) Inventor: Brian D. Thompson, Palos Verdes Estates, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 1088 days.

(21) Appl. No.: 09/910,161

(22) Filed: Jul. 20, 2001

(65) Prior Publication Data

US 2003/0018973 A1 Jan. 23, 2003

(51) Int. Cl.
*H04N 5/445* (2006.01)
*G06F 3/00* (2006.01)
*G06F 13/00* (2006.01)

(52) U.S. Cl. ........................ 725/38; 725/151
(58) Field of Classification Search ............... 725/46, 725/47, 56, 14
See application file for complete search history.

(56) References Cited

U.S. PATENT DOCUMENTS

| 5,323,240 | A | * | 6/1994 | Amano et al. ............... 348/731 |
| 5,585,865 | A | * | 12/1996 | Amano et al. ................. 725/14 |
| 5,801,747 | A | * | 9/1998 | Bedard .......................... 725/46 |
| 6,144,376 | A | * | 11/2000 | Connelly ....................... 725/44 |
| 6,219,837 | B1 | | 4/2001 | Yeo et al. ...................... 725/38 |
| 6,445,306 | B1 | * | 9/2002 | Trovato et al. .......... 340/825.24 |
| 6,721,953 | B1 | * | 4/2004 | Bates et al. .................... 725/39 |
| 6,769,127 | B1 | * | 7/2004 | Bonomi et al. ................ 725/39 |
| 2002/0056098 | A1 | * | 5/2002 | White .......................... 725/39 |
| 2002/0083452 | A1 | * | 6/2002 | Kikinis ......................... 725/46 |
| 2002/0104081 | A1 | * | 8/2002 | Candelore et al. .............. 725/9 |
| 2002/0152459 | A1 | * | 10/2002 | Bates et al. ..................... 725/9 |
| 2003/0056216 | A1 | * | 3/2003 | Wugofski et al. ............. 725/46 |
| 2004/0216160 | A1 | * | 10/2004 | Lemmons et al. ............ 725/46 |

FOREIGN PATENT DOCUMENTS

| WO | WO 99/35843 | * | 7/1999 |
| WO | WO 9935843 A1 | * | 7/1999 |

OTHER PUBLICATIONS

Sabra Chartrnd, "Patents: Software to Coordinate Home Electronics", New York Times, Apr. 23, 2001.

* cited by examiner

*Primary Examiner*—Andrew Y. Koenig
*Assistant Examiner*—Dominic D Saltarelli

(57) ABSTRACT

A method and apparatus for computing a schedule of channels is disclosed. The method comprises the steps of accepting a series of commands to tune a plurality of channels sequentially from an ordered schedule of channels; determining a duration of a time period between each of the series of commands; and prioritizing the schedule of channels according to the duration of the time period during which each channel is tuned. The apparatus comprises a user interface for accepting a series of commands to tune a plurality of channels sequentially from an ordered schedule of channels and a processor, communicatively coupled to a memory, the processor implementing a timer for determining a duration of a time period during which each channel is tuned and prioritizing the schedule of channels according to the duration of the time period during which each channel is tuned.

32 Claims, 8 Drawing Sheets

METHOD AND APPARATUS FOR ADAPTIVE CHANNEL SELECTION

BACKGROUND OF THE INVENTION

1. Field of the Invention

The present invention relates to systems and methods for selecting from a plurality of channels transmitting media programs, and in particular to a system and method for adaptively generating an ordered schedule of channels based on viewer channel surfing habits.

2. Description of the Related Art

Systems for transmitting media programs to viewer are well known in the art. Such systems include direct broadcast satellite systems, cable systems, and terrestrial broadcast systems. There is a trend in such systems to offer greater and greater numbers of channels, especially in subscriber based systems. Currently, many such systems include 200 or more channels. As the number of channels increase, users are confronted with the need to navigate through a large number of channels. Channel guides for television are often complicated and difficult to navigate. They also are generally not configured to assist the user in selecting channels by quickly scanning through the available channels in a more or less sequential order (e.g. channel surfing). Channel guides are also of limited use in car audio systems and hand held devices, since such guides generally rely on a significant amount of visual information that cannot be easily digested by the user. Selecting channels in such systems require a simple, easy to use user interface.

What is needed is a simple, easy to use user interface that allows the user to scan a large number of channels and more quickly find a media program of interest. The present invention satisfies that need.

SUMMARY OF THE INVENTION

To address the requirements described above, the present invention discloses a method and apparatus for computing a schedule of channels. The method comprises the steps of accepting a series of commands to tune a plurality of channels sequentially from an ordered schedule of channels; determining a duration of a time period between each of the series of commands; and prioritizing the schedule of channels according to the duration of the time period during which each channel is tuned. The apparatus comprises a user interface for accepting a series of commands to tune a plurality of channels sequentially from an ordered schedule of channels and a processor, communicatively coupled to a memory, the processor implementing a timer for determining a duration of a time period during which each channel is tuned and prioritizing the schedule of channels according to the duration of the time period during which each channel is tuned.

The foregoing offers an adaptive system that dynamically adjusts how channels are presented to the user based on the amount of time the user dwells on a single channel before moving onto the next selection. This method offers a simple way to learn user preferences, and adjusts to the current programming. The method is scaleable to systems with many channels of content, can work in conjunction with other systems such as nested channel lists, and can work with the simplest of user interfaces found in car audio systems or handheld wireless devices.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

The advent of the remote control has made it much more common for viewers to change between several programs during commercial breaks. However, current systems do not allow a convenient method for a user to elect several favorite programs during a current session and change quickly between them. Some systems allow the user to delete channels that are never watched (such as foreign language channels) or customize channels lists (such as sports or news). Other systems offer a "favorites" list that presents the top ten channels based on total accumulated viewing time. Still other systems allow the user to reprogram buttons for one-touch access to programs, but these systems are usually limited to only one or two channels and they are cumbersome to use.

The present invention learns which channels a user in most interested in watching for that viewing session and presents those channels to the user first when changing the channels with a simple two button ("+" and "−") user interface. It does not require the user to reprogram play lists. Unlike other systems which are limited to one or two channels, the present invention accommodate any number of channels that a user wishes to select. It also can be reset (reordered so the channels are presented in sequential order) at a time associated with a change in a threshold number of media programs (e.g. such as at the top of the hour when new media programs selections are available).

Media Reception and Presentation System

Figure 1:
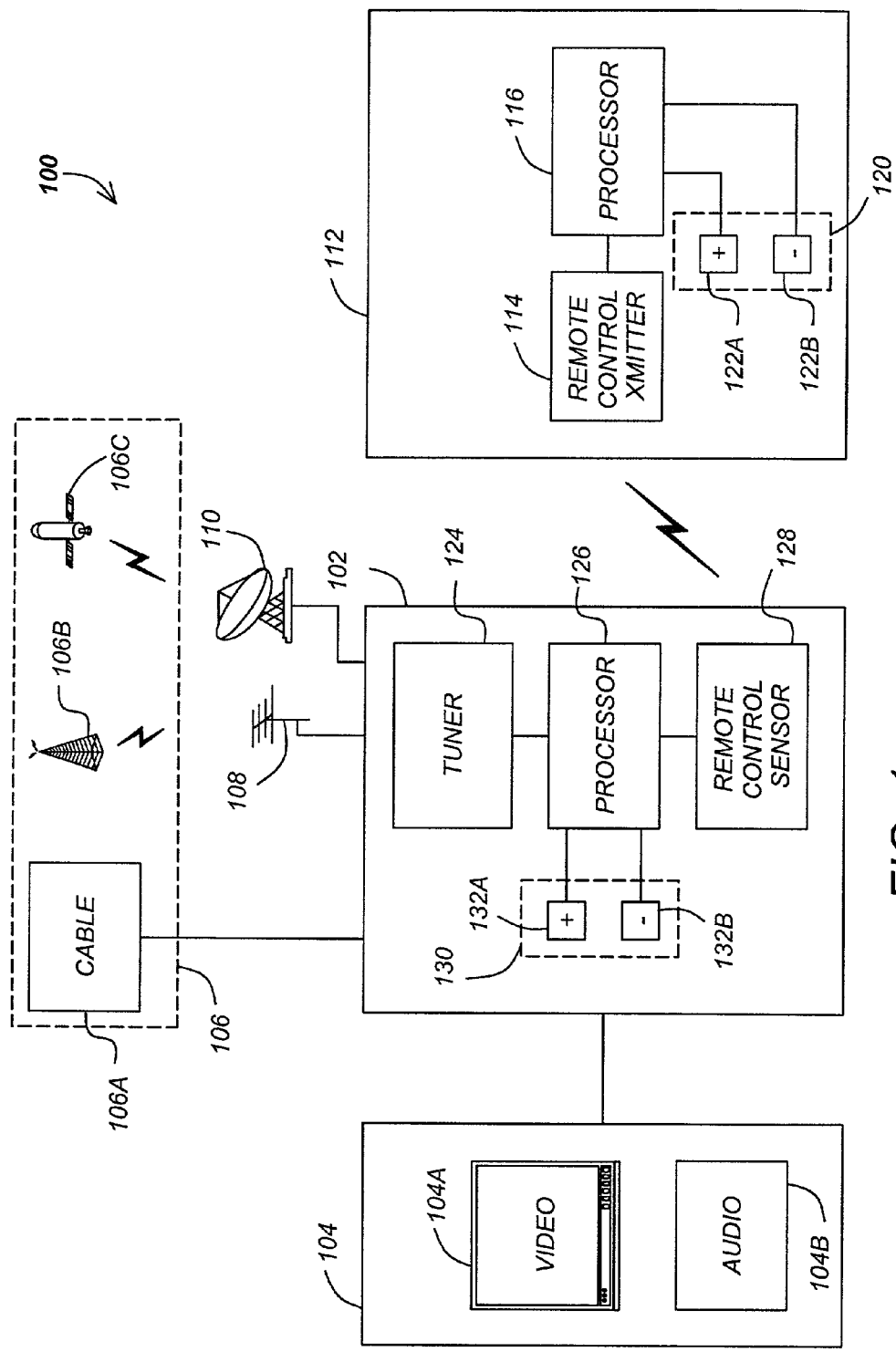
FIG. 1 is a block diagram showing an exemplary system for receiving and presenting media programs.

FIG. 1 is a diagram depicting one embodiment of a media program reception and presentation system 100. The system 100 comprises a media program source 106, a receiver 102, and a media program presentation device 104. The media program source 106 can include a cable transmission system 106A, a terrestrial transmission system 106B, a satellite transmission system 106C, or other transmission system such as the Internet. The media presentation device 104 can include a video presentation device 104A such as a television or monitor, an audio reproduction system 104B, or both. The receiver 102 includes a tuner 124 for selecting a channel carrying a media program of interest on a signal from one or more of the media program sources 106.

The tuner 124 is communicatively coupled to one or more of the media program sources 106. Where communicative coupling is established with a cable media provider 106A, the connection is typically directly to the receiver 102. Where the communicative coupling is established to a terrestrial transmission system 106B, the coupling is established via a terrestrial antenna 108. Where the communicative coupling is established to a satellite transmission system, the coupling is established via a satellite dish antenna 110 and associated hardware.

The tuner 124 is also communicatively coupled and typically controlled by a processor 126. Channels may be selected via a receiver user interface 130 having one or more receiver channel selection buttons 132. In one embodiment, the channel selection buttons include an up channel button 132A (+) and a down channel button 132B (-). In one embodiment, selecting the up channel button 132A commands the processor to tune the next succeeding channel in an ordered series of channels, and selecting the down channel button 132B to select the previous channel in the ordered series of channels. The user interface 130 may also include other controls that allow the user to select channels directly as well.

In one embodiment, the media reception and presentation system 100 also comprises one or more remote controls 112. In such cases, the receiver 102 may include a remote control sensor 128 communicatively coupled to the processor 126. The remote control sensor 128 receives commands and other information from the remote control 112 and provides the commands/information to the processor 126.

The remote control 112 includes a remote control transmitter 114 for transmitting messages (via wire, infrared, or radio frequency transmission). The transmitter 114 is communicatively coupled to a remote control processor 116 which generates messages for transmission by the transmitter 114 based on inputs from the remote control user interface 120. In one embodiment, the remote control user interface 120 includes an up channel button 122A and a down channel button 122B, which provides analogous functionality as buttons 132A and 132B.

In one embodiment, one or more of the functions provided by the receiver 102, the media presentation device 104, or the remote control 112 may be provided by a computer or similar processor. Further, the input to such computer (to supply the media programs and associated commands) can be from a direct link to the media program source, through a dial-up service, or via the Internet. The receiver 102 could also be placed in a mobile environment such as a vehicle. Further, the media programs can include video information, audio information, or both.

Figure 2:
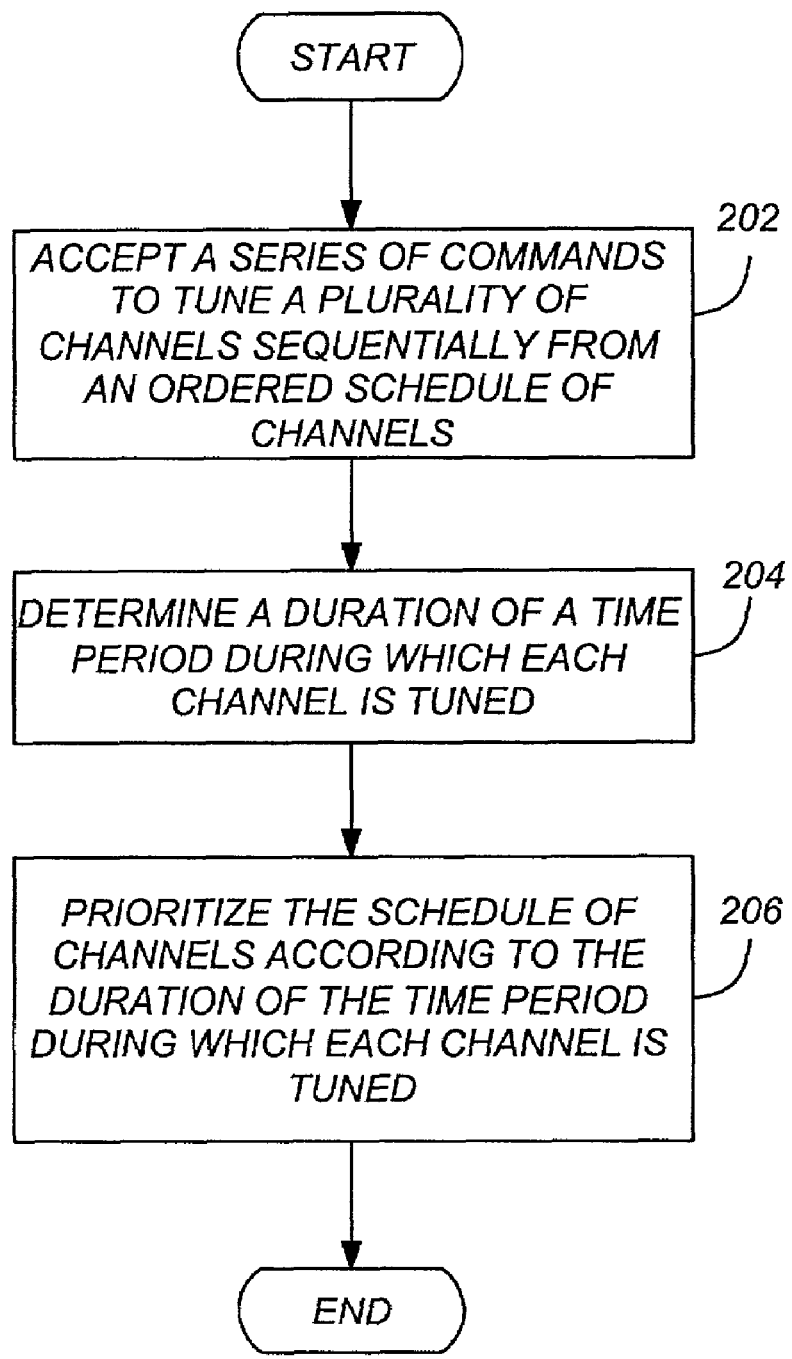
FIG. 2 is a flow chart presenting exemplary process steps that can be used to practice one embodiment of the invention.

FIG. 2 is a flow chart presenting illustrative method steps that can be used to practice one embodiment of the present invention. As shown in block 202, a series of commands to tune a plurality of channels sequentially from an ordered schedule or list of channels are accepted. The commands can be entered, for example via the receiver 102 user interface or the remote control user interface 120. If the commands are entered via the remote control user interface 120, the user input is provided to the processor 116, a message is generated by the processor 116, and an appropriate command signal is output by the remote control transmitter 114.

The command signal is received by the remote control sensor 128 and provided to the processor 126, which commands the tuner 124 to tune to the channel selected by the user. Where the user input is provided by the receiver user interface 130, the commands are provided directly to the processor 126.

As shown in block 204, a duration of time during which each successive channel is tuned is determined. This can be determined from the duration of the time period between channel commands, or the period of time that the channel is actually tuned. These tune durations are stored in a memory within the processor 126 or within a memory communicatively coupled thereto. In another embodiment, the time durations are stored in a memory in the remote control 112 (e.g. in the processor 116 or a memory communicatively coupled thereto).

As shown in block 206, a schedule of channels is prioritized according to the duration of the time period during which each channel is tuned.

Time durations and other information can be stored for a plurality of individual users as well. This permits media presentation system to provide a simplified user interface to more than one user. This is especially useful, as users may have widely different viewing habits. The receiver 102 or remote control 112 can identify the user from an explicit user input ID or from other user inputs. For example, the receiver 102 or remote control 112 can determine the identity of the user from the channels selected by the user, the pattern of selection, and/or the time the user views each channel.

In one embodiment, the present invention excludes certain channels from consideration in determining the time duration of the channel (e.g. the time duration is always set to the minimum amount). This prevents selected channels from being prioritized, according to the user's wishes. For example, the user may wish to exclude channels having adult content from the foregoing.

Figure 3:
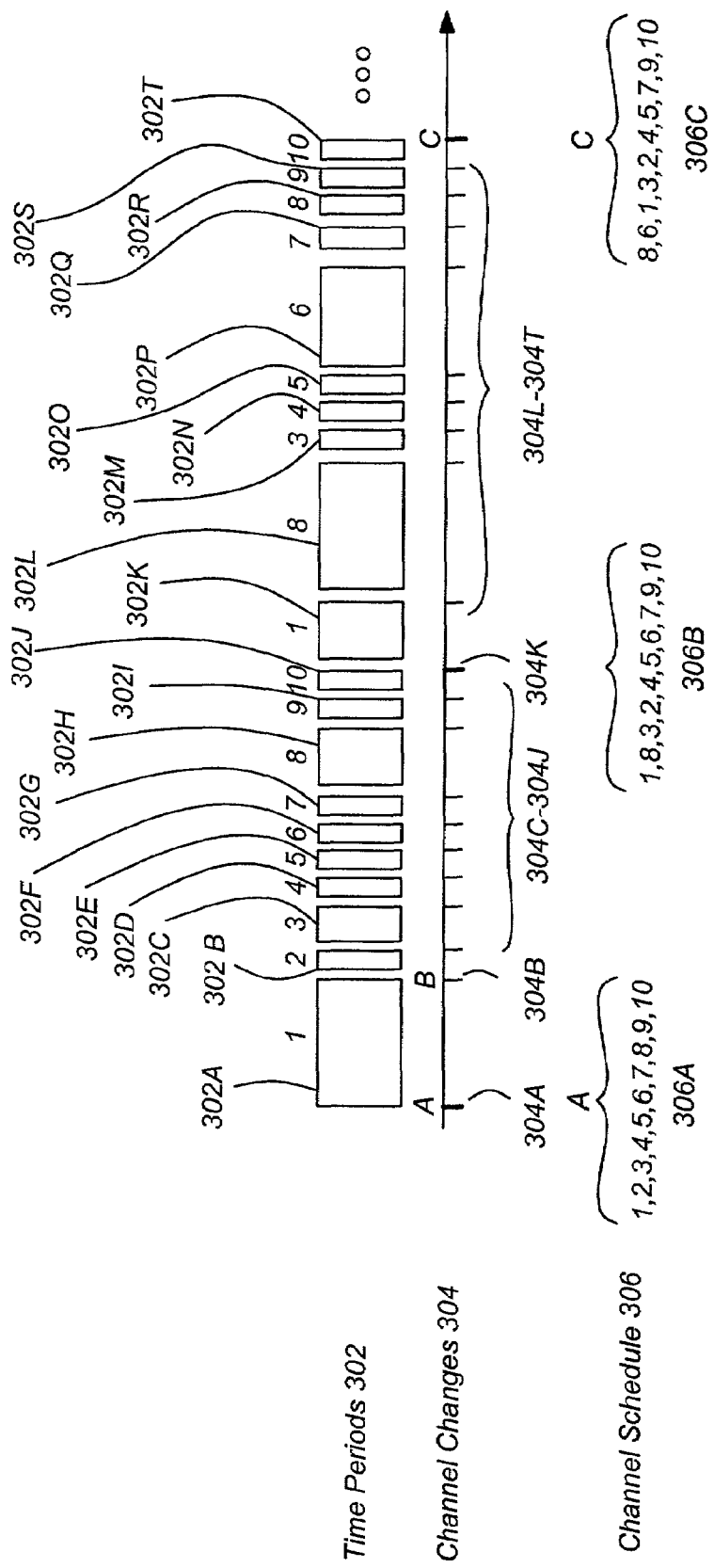
FIG. 3 is a diagram illustrating the application of one embodiment of the present invention.

FIG. 3 is a diagram showing an exemplary application of the present invention. At time A, the channel schedule 306 is set so that the channels are in sequential order (e.g. to the series {1,2,3,4,5,6,7,8,9,10}), and the user has selected channel 1. At time B, a channel change 304 is commanded (e.g., by depressing user input 122A or 132A). The tuner 124 is then tuned to the next succeeding channel in the current channel schedule (in this case, channel schedule 306A), which is channel 2. The duration of the time period during which channel 1 was tuned 302A is stored and used to compute a new channel schedule. Similar time periods (302B-302J) are computed as commands to tune the next succeeding channel (e.g. 304C-304J) are processed and the tuner 124 is tuned to the appropriate channel. After all of the channels (in this case, channels 1-10) in the channel schedule 306 have been tuned, the channel schedule 306 is prioritized according to the time periods 302A-302J. In the illustrated embodiment, this prioritization places the channels in order according to the length of the time periods 302A-302J associated with each channel. The result is a reordered channel schedule 306B. In the illustrated example, the channels are reordered so that the channel associated with the longest time period (e.g. channel 1) is presented first, the next longest time period (e.g. channel 8) is presented next, and so on. This results in the ordering of the channels in the channel schedule 306 as {1,8,3,2,4,5,6,7,9,10}.

This process is repeated as the user again scans the channels again. As shown in FIG. 3, the user paused for the longest time period on channel 8, the second to the longest time period on channel 6, and the third longest time period on channel 1. Hence, the reordered channel schedule 306C now places the channels in order with 8 appearing first, then channel 6, then channel 1.

In the illustrated embodiment, the new schedule is determined after all of the channels in the channel schedule have been selected, but this need not be the case. New channel schedules 306 can be computed after each channel change, after a threshold number of channel changes, or after a specified or adaptive time period has elapsed. This can be implemented by weighting each of the time periods by a value inversely proportional with time, or by rolling off measured time periods in a first-in-first-out manner.

The channel sequences determined above (or at least the most recent channel selection) can be saved when the receiver 102 is deactivated, or can be reset, preferably at the user's selection. Further, provision can be made to allow the user to reset the channel schedule to the baseline sequence 306A on command. In one embodiment of the invention, the channel schedule 306 can be reset to the baseline sequence (or any pre-set sequence) at a time associated with a change in a threshold number of media programs associated with the channels in the schedule of channels. For example, the channel schedule 306 can be reset to the baseline channel schedule 306A or another preset schedule at the top of the hour when new programming selections are available.

Figure 4:
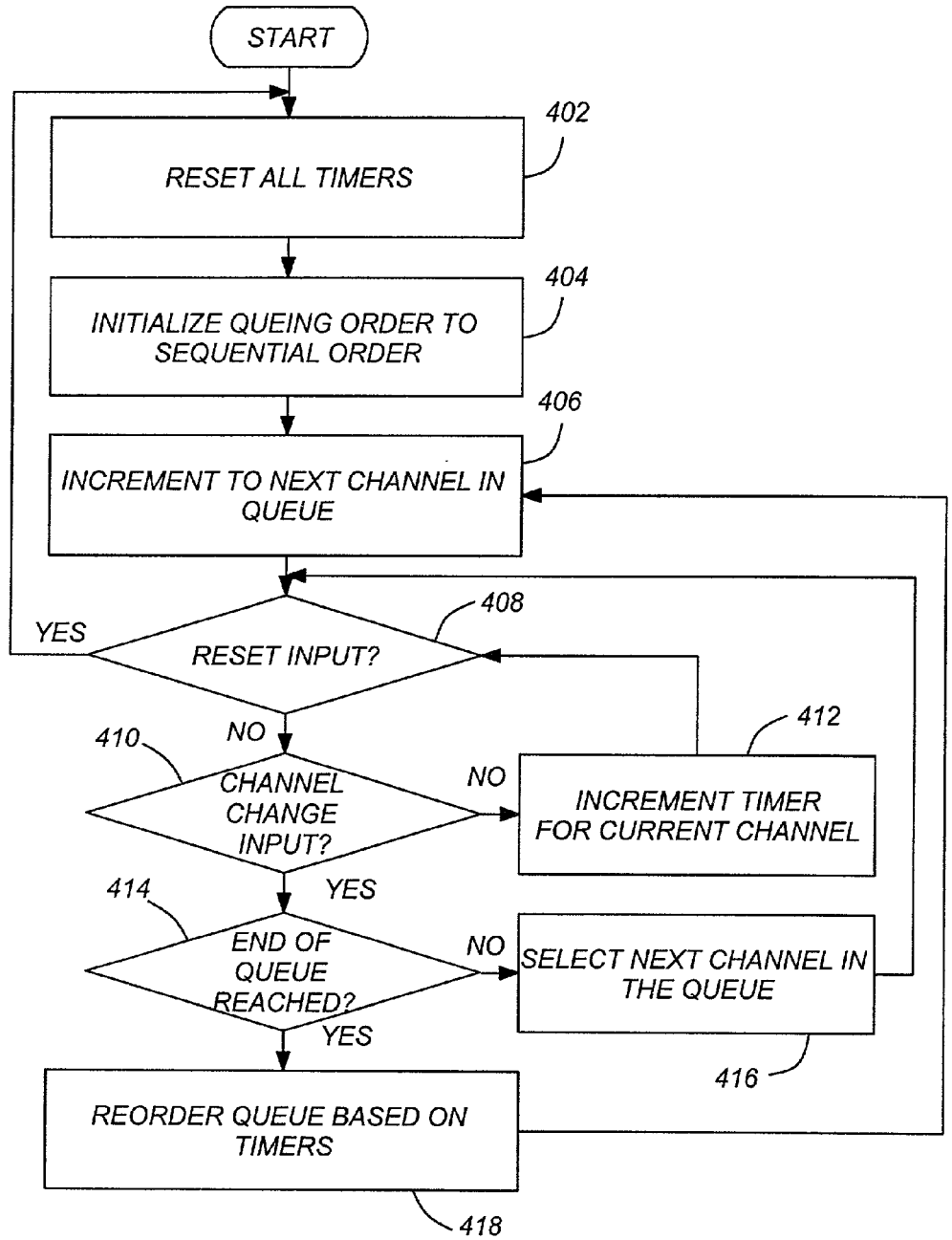
FIG. 4 is a flow chart further illustrating exemplary process steps that can be used to practice one embodiment of the present invention.

FIG. 4 is a flow chart presenting more detail regarding how one embodiment of the present invention may be implemented. Block 402 resets all timers. Block 404 initializes the channel schedule queuing order to a baseline sequence order (e.g. baseline sequence 306A or a pre-selected sequence). Block 406 increments to the next channel in the queue. This is typically in response to a user input to view the next channel in the current channel sequence. If a command to reset is input, block 408 returns processing to block 402. If not processing proceeds to block 410. Block 410 determines if a command to change the channel (+ or −) is input If not, a timer for the current channel is incremented (as shown in block 412) and processing returns to block 408. If a channel change command has been input block 414 determines whether the end of the queue (the current channel schedule 306) has been reached. If not, the next channel in the queue is selected (as shown in block 416) and processing returns to block 408. Thereafter, a timer for the newly selected (current) channel is incremented as required. If the end of the queue is reached, processing is passed to block 418, which reorders the queue (channel schedule 306) based on the timer values.

The operations shown in FIG. 4 can be modified so that only the most recent viewing times are given more importance. This can be accomplished by weighting the timer values. Time duration values from the most recent scan is given a weight of one. Time duration values from previous scans are given lower weights depending on how quickly the user wants the system to provide less consideration to earlier choices. This weighting parameter can be set with a user dialog box or preset based on typical or measured viewing patterns. In this case, the time duration during which each particular channel is tuned ($T_{Accumulated\ Channel\ N}$) can be computed as:

$$T_{Accumulated\ Channel\ N} = T_{Accum}(t=t_a\ to\ t_b) * W_1 + T_{Accum}(t=t_b\ to\ t_c) * W_2 + \quad \text{EQ(1)}$$

wherein

N is the channel; $T_{Accum}$ ($t=t_a$ to $t_b$) is the duration of time during which channel N was tuned during the time interval between and $t_a$ and $t_b$; $W_1$ is the weight applied to the duration of time during which channel N was tuned during the time interval from $t_a$ to $t_b$, $T_{Accum}$ ($t=t_b$ to $t_c$) is the duration of time during which channel N was tuned during the time interval between $t_b$ and $t_c$; $W_2$ is the weight applied to the duration of time during which channel N was tuned during the time interval between $t_b$ and $t_c$, and so on. The time intervals $t_a$ to $t_b$ and $t_b$ and $t_c$ can be absolute time intervals (e.g. every 5 minutes), or can be a time interval determined according to user input events. For example, the first time interval from $t_a$ to $t_b$ can be the time between which the user has scanned through all of the channels in the channel schedule.

In another embodiment of the present invention, the channels in the channel schedule 306 are segregated into a first (A) list of channels that the user wishes to return to and a second (B) list of channels that are not of interest to the user during the current viewing session. As in other embodiments, this embodiment of the invention is operable with a simple user interface using just an up channel command (+) and a down channel command (−).

Figure 5:
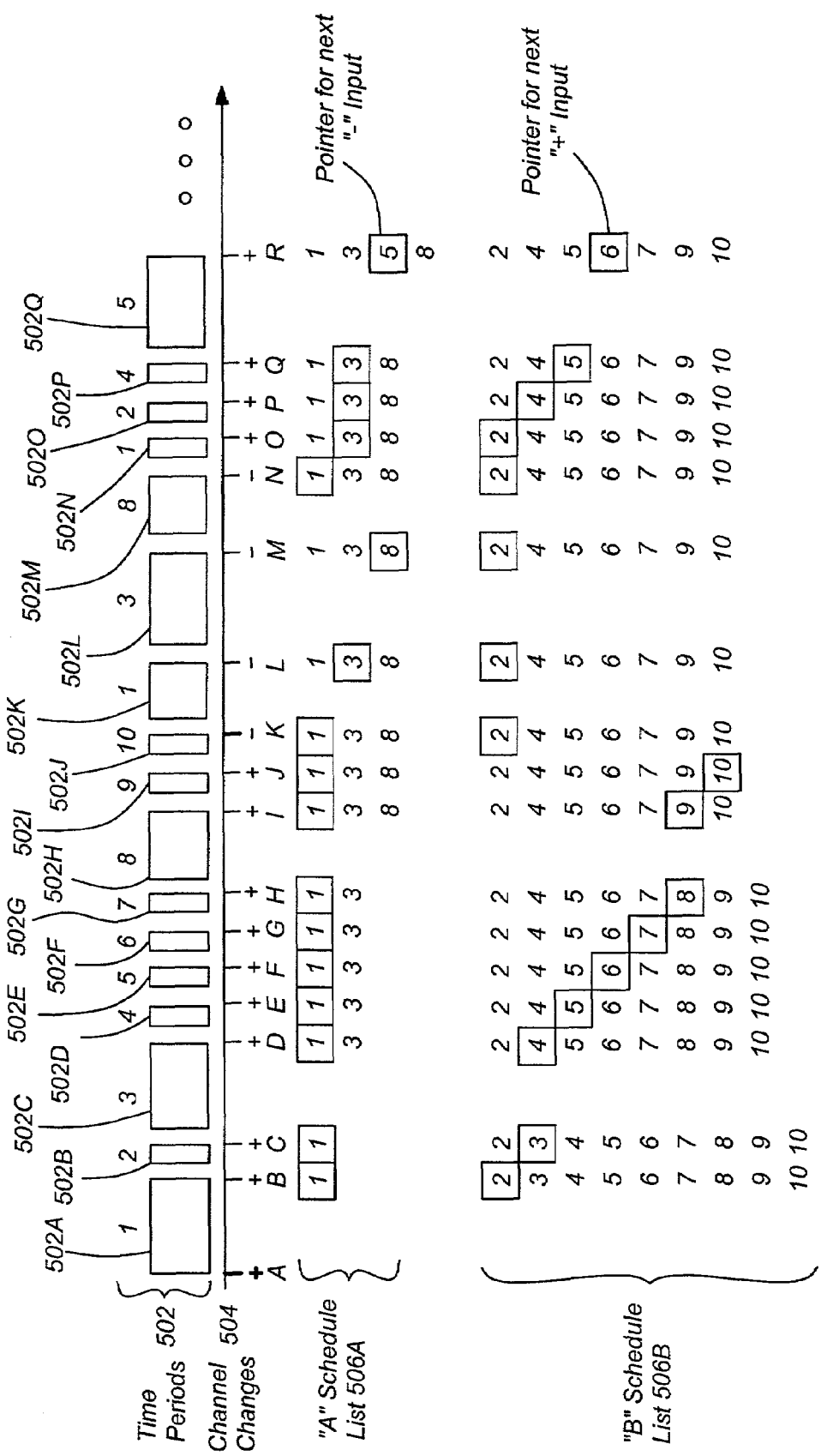
FIG. 5 is a diagram illustrating the application of a second embodiment of the present invention.

FIG. 5 is a diagram showing an illustrative example of how the first and the second channel lists are compiled. In the illustrated embodiment, separate pointers are maintained. The pointers determine the relationship between user up-channel (+) and down channel (−) commands and the channel that the tuner 124 is commanded to tune to. As shown in FIG. 5, a down-channel command (−) selects a channel from the "A" schedule list 506A according to a first pointer, and an up-channel command (+) selects a channel from the "B" channel schedule list 506B according to a second pointer.

In the illustrated example, at time "A" the receiver 102 either "wakes up" or is commanded to tune to channel 1. The user selects the up-channel control (+) on the channel change axis 504, at time "B", thus commanding the tuner 124 to tune channel 2. If channel 1 was a channel of interest (determined as such if the duration of the time period for which channel 1 was tuned exceeded a threshold time duration $t_{thresh}$), channel 1 is added to the "A" schedule list 506A as shown.

Next, the user provides another up-channel command (+) at time "C". Since the pointer for the next up channel input is channel 3, the receiver 102 is thus commanded to tune the receiver 102 to channel 3, and the pointer for the next up channel input is moved to the next channel (channel 4) in the "B" schedule list 506B. In the illustrated embodiment, the time for which channel 2 was tuned (which can be determined by the time the channel was actually tuned, or determined as the difference between successive commands) is less than $t_{thresh}$, and therefore channel 2 remains on the "B" schedule list 506B and is not placed on the "A" schedule list 506A.

The user provides another up-channel command (+) at time "D". Since the pointer is directed at channel 4, the receiver 102 is thus commanded to tune the receiver 102 to channel 4, and the pointer for the next up channel input command is moved to the next channel (channel 5) in the "B" schedule list 506B. In the illustrated embodiment, the time for which channel 3 was tuned is greater than $t_{thresh}$, and therefore, channel 3 is placed in the "A" schedule list 506A.

Similarly, as the user provides succeeding up-channel commands at times "D", "E", "F", "G", and "H", each time pausing for less than $t_{thresh}$, the up channel pointer is moved successively to each next channel, and the channel remains on the "B" schedule list 506B.

At time "I", the user provides another up-channel command (+). Since the duration for which channel 8 was tuned is greater than $t_{thresh}$, channel 8 is added to the "A" schedule list 506A. The user then provides commands to tune channels 9 and 10, which remain on the "B" schedule list 506B.

At time "K", the user provides a down-channel command (−). Since the pointer for the "A" schedule list 506A is on channel 1, the receiver 102 is commanded to tune channel 1. Since channel 1 was tuned for greater than $t_{thresh}$, it remains on the "A" schedule list 506A, and the pointer for the next down-channel input is moved to the next channel on the "A" schedule list 506A, which is channel 3.

Channel 3 remains tuned until time "M", when the user provides another down-channel command. Since channel 3 was tuned for greater than $t_{thresh}$, it remains on the "A" schedule list 506A. Further, the pointer for the next down-channel input is moved to the next channel on the "A" schedule list 506A, which is channel 8.

At time "N", the user provides a down-channel command (−). Since the down-channel pointer is at channel 1, the receiver 102 is commanded to tune channel 1.

At time "0", the user provides an up-channel command (+). Since the up-channel pointer is at channel 2, the receiver 102 is tuned to channel 2. In the illustrated embodiment, although channel 1 was tuned the second time for less than $t_{thresh}$, channel 1 is not removed from the "A" schedule list 506A.

At times "P" and "Q", the user provides an up-channel command (+), thereby commanding the receiver 102 to tune channels 4 and 5. Since channel 4 is tuned for less than $t_{thresh}$, it remains on the "B" schedule list 506B. However, the tuner remains tuned to channel 5 until time "R". Thus, the tuner 124 is tuned to channel 5 for longer than $t_{thresh}$, and channel 5 is added to the "A" schedule list 506.

Figure 6A:
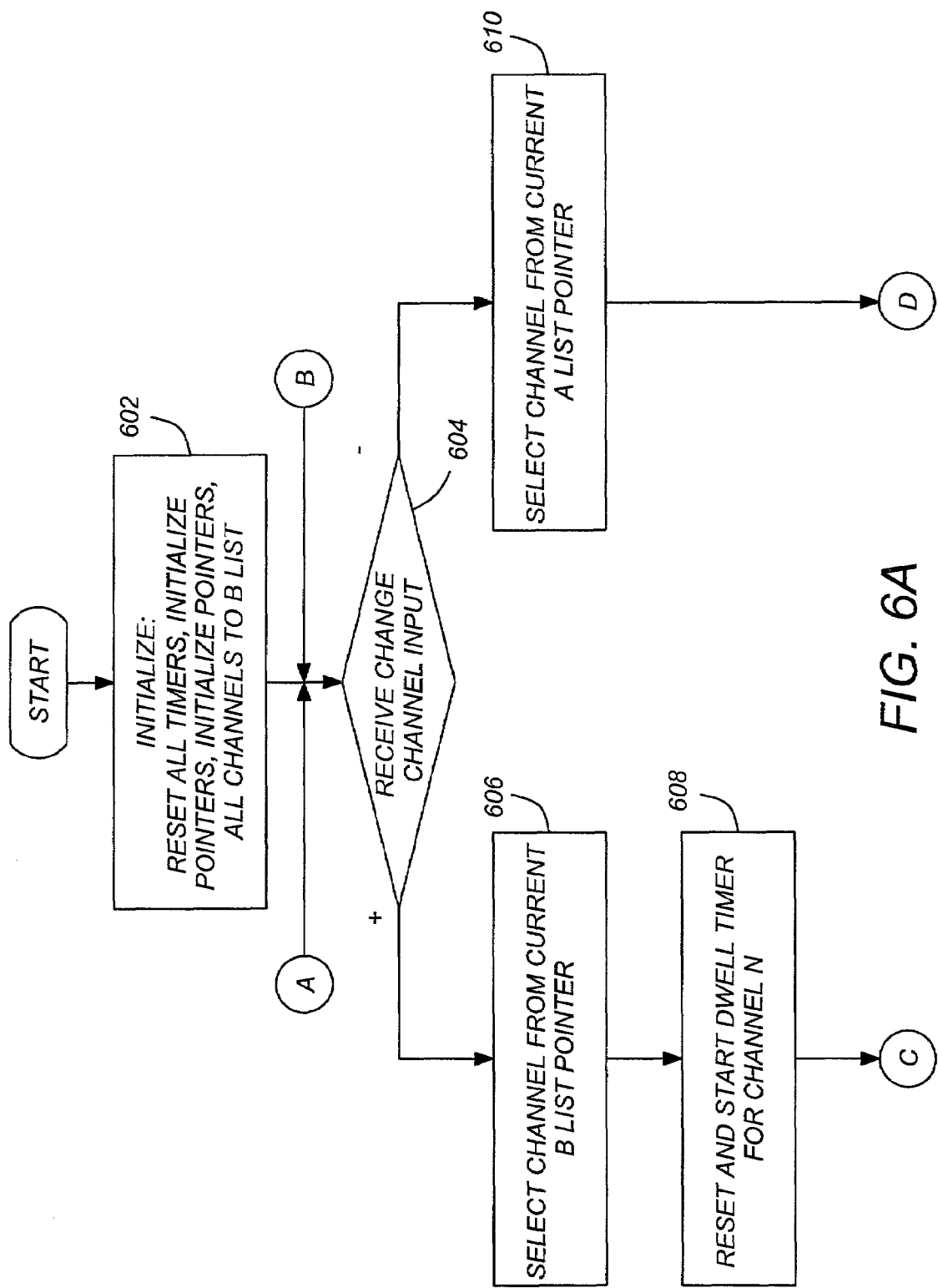
FIGS. 6A-6C are flow charts presenting exemplary process steps that can be used to practice the second embodiment of the invention.
Figure 6B:
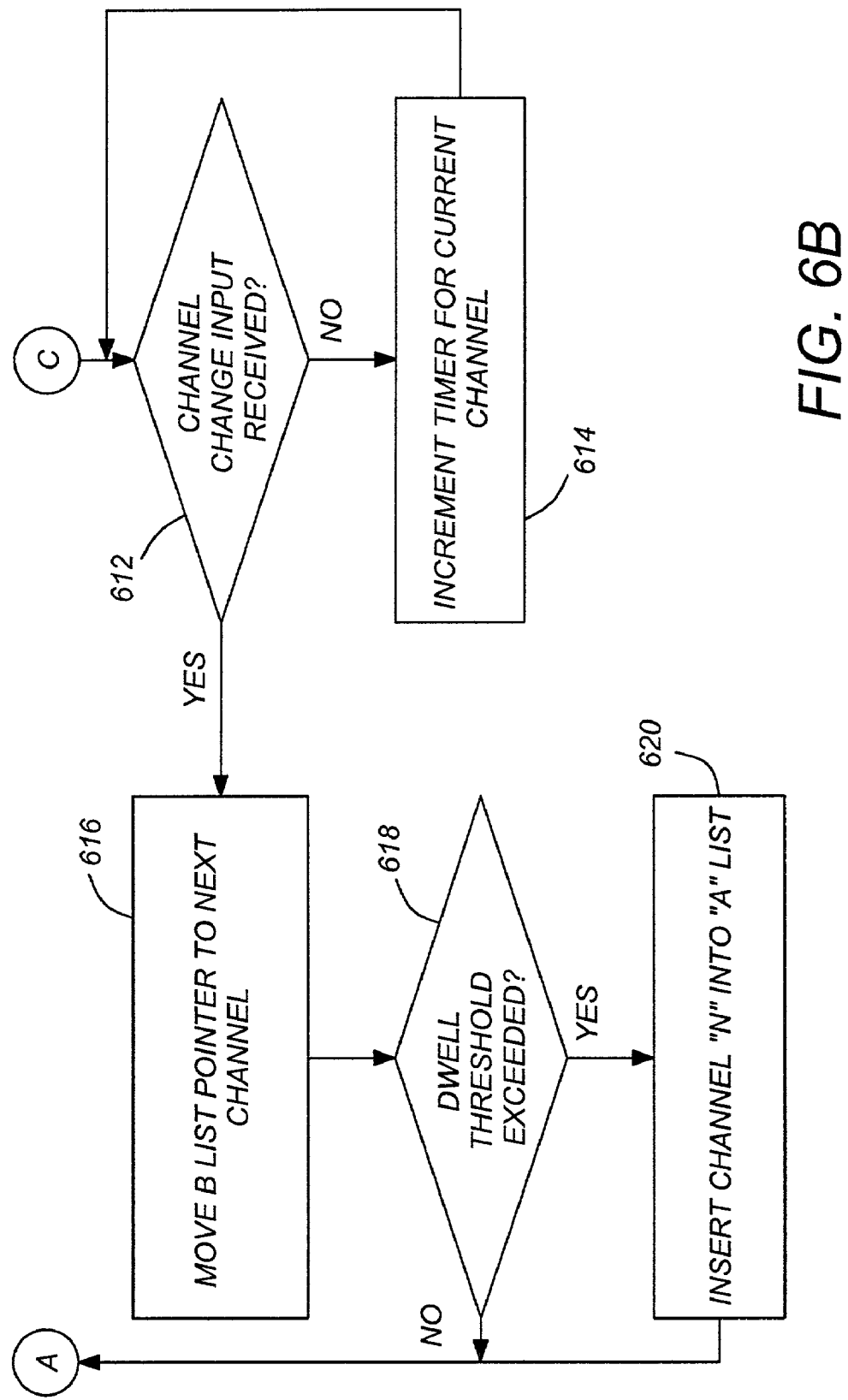
Figure 6C:
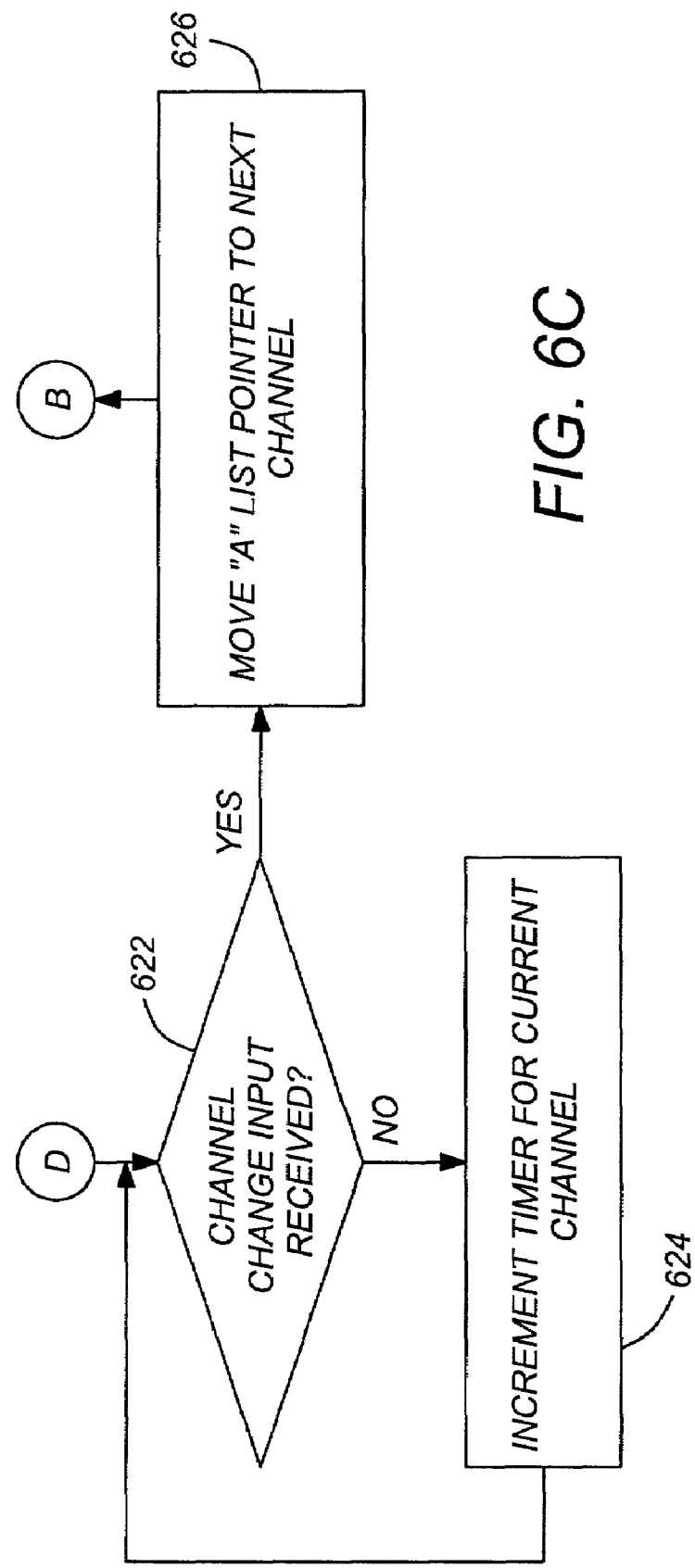

FIGS. 6A-6C are flow charts presenting illustrative operations that could be used to practice an alternative embodiment of the present invention. First, all timers are reset, pointers are initialized, and all channels are placed on the "B" schedule list 506B. This is illustrated in block 602. Block 604 tests to determine whether the user provided an up-channel command (+) or a down-channel command (−). If the user input is an up-channel command (+), processing is passed to block 606, which selects the channel (channel N) from the current "B" schedule list 506B pointer. Then, a timer which will determine the time period during which channel N is tuned is reset and started, as shown in block 608. Turning to FIG. 6B, processing is passed to block 612 which determines whether a channel change input is received. If no channel change input command is received, the timer for the current channel (channel N) is incremented (as shown in block 614), and processing is returned to block 612. If a channel change input command is received, processing passes to block 616, which moves the "B" schedule list 506B to the next channel in the "B" schedule list 506B. Processing is then passed to block 618, which tests to determine whether the "dwell" threshold ($t_{thresh}$) has been exceeded. If the dwell threshold has not been exceeded, processing returns to block 604. If the dwell threshold has been exceeded, the currently tuned channel (channel N) is moved to the "A" schedule list 506A, as shown in block 620. Processing is then passed to block 604.

If the channel change input is a down-channel command, processing is passed from block 604 to block 610. In block 610, a channel is selected from the current "A" schedule list 506A. Next, block 622 determines whether a channel change input command was received. If so, the "A" list pointer is moved to the next channel in the "A" schedule list 506A, as depicted in block 626. If not, processing is passed to block 624, which increments the timer for the current channel. After the timer is incremented, processing is then passed to block 622.

The foregoing discussion illustrated how the channels could be moved from the "B" schedule list 506B to the "A" schedule list 506A according to user commands defining the duration of the time that the tuner 124 is tuned to each channel. It is noted, however, that the foregoing could be implemented by measuring the time duration between successive user commands. This allows the functionality to determine which channel appears next to be resident in the remote control instead of the receiver 102.

Although in the embodiment described with respect to FIG. 5, each qualifying channel is added to the "A" schedule list 506A as soon as it is determined that the channel was tuned for greater than $t_{thresh}$, this need not be the case. Instead, channels can be added to the "A" schedule list 506A after all of the channels have been scanned (in the illustrated embodiment, channels 1-10), of when a threshold number of channels have been scanned. Further, in another embodiment of the present invention, the "A" schedule list can be updated continuously. Hence, as soon as it is determined that channel 1, for example, is tuned for a duration greater than $t_{thresh}$, channel 1 can be added to the "A" schedule list, even before a command to tune to a different channel is received.

Channels can remain in the "A" schedule list 506A in the order in which they were added, or they may be reordered in order of how long each channel was tuned. Similarly, although channels which are tuned for less than $t_{thresh}$, are not added to the "A" schedule list, those channels which remain on the "B" schedule list 506B can also be ordered to place the channels which are viewed the longest first.

Selective Dwell Timer Reset

As described above, the present invention includes the ability to reset all of the timers at the beginning of a particular viewing session. The command to reset all timers can be invoked automatically (e.g. upon power up) or can be explicitly commanded. In one embodiment, the present invention also allows the user to selectively reset the timer for one or more selected channels. This feature is useful, for example, in situations where the user selects a particular channel and leaves the room. Since the selected channel could be tuned for an extensive period of time that is not related to the time the program is actually viewed by the user, the channel could be prioritized at or near the top of the channel order (or move to the "A" schedule list 506A), even though it is not necessarily a preferred channel. In this instance, the user can command the system to selectively reset the timer for this channel, preventing that channel from being prioritized relative to the other channels. This can be accomplished via an additional user interface (e.g. button) on the remote control 112 or the receiver 102, or by selecting buttons in series or parallel combinations. For example, the foregoing can be implemented by selecting both the "+" button 122A and the "−" button 122B.

Nested Channel Lists

Some program guides (such as those offered by DIRECTV) allow the user to maintain separate channel lists having a subset of all available channels. Such channel lists can be used, to group channels with similar content together (e.g. sports channels or children's channels). These channel lists may also include a list of channels that a particular user was interested in that did not include the full selection of available channels. The present invention can operate with these separate channel lists without beginning with the list of all available channels. This allows the user interested in a particular defined subset of programs (e.g. sports programming) on a separate channel list to begin with the identified subset of available channels and have that list dynamically prioritized based on the dwell time on each channel. Similarly, the user could start with the identified subset of available channels and the present invention will dynamically separate the channels into the "A" schedule list 506A and the "B" schedule list 506B.

Other Lists

User dwell time is only one example measurement parameter based on user input that can be measured to prioritize channel selection or separate available channels into one or more lists (e.g. the "A" schedule list 506A or the "B" schedule list 506B). Other parameters can also be used. For example, a personal video recorder system (PVR) may include provision for the user to evaluate programs that the system has selected (e.g. like or dislike). The data collected from such user interaction can be used to pare down the complete list of channels by giving the user "keep" or "delete" options for each channel. This can be implemented with the buttons 122A and 122B or with additional user input devices.

In one embodiment of the invention, user input is accepted from other systems, including interactive TV systems and used to prioritize channel selections and/or pare down channel lists. Data indicative of user interest in the media programs transmitted on one or more channels, for example, in the form of output from click stream monitoring programs (which monitor Internet useage) can also be used to prioritize the schedule channels or separate the channels into an "A" list 506A or a "B" list 506B. In a simple such implementation, the system counts the number of on-screen clicks for a given viewed channel and uses the screen click sum as an alternative to the dwell or viewing time of the channel. Also, the number of on-screen clicks for a particular channel can be combined with the dwell time (time that the channel is tuned) by weighting each click with a certain amount of time (e.g. one click being considered equivalent to an additional minute of dwell time). Further, the parameter of additional dwell time per click can be adjusted for typical TV useage patterns for or each user, or explicitly defined or adjusted by the user.

In other embodiments, user input from other interactive television systems is used to track user preferences and to use these preferences to prioritize the presentation of channels to the user. For example, in one embodiment, the present invention accepts an Internet click stream (from an interactive television or a conventional computer) and records and categorizes uniform resource locators (URLs) to determine preferences. Such preferences can include content based preferences (e.g. sports programming), that are used to preferentially present channels with similar content to the user. For example, if the click stream indicated a preference for professional basketball, the channel selection algorithm accepts this information as well as electronic programming guide (EPG) information to determine which channels are displaying professional basketball during the user's viewing session and prioritize those channels as they are presented to the user.

CONCLUSION

The foregoing description of the preferred embodiment of the invention has been presented for the purposes of illustration and description. It is not intended to be exhaustive or to limit the invention to the precise form disclosed. Many modifications and variations are possible in light of the above teaching. For example, while the foregoing example is presented with respect to television viewing, the present invention can be used for a wide variety of media services, including audio. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of computing a schedule of channels, comprising the steps of:
   accepting channel surfing commands having a series of commands to tune a plurality of channels sequentially from an ordered schedule of channels;
   determining a duration of a time period during which each channel in the plurality of channels is tuned by the series of commands;
   determining which of the time periods exceeds a threshold time period;
   segmenting the channels into a first segment having channels associated with a time period exceeding the threshold time period and a second segment having channels associated with a time period not exceeding the threshold time period,
   ordering the channels in the first segment according to the duration of the time period associated with each channel;
   ordering the channels in the second segment according to the duration of the time period associated with each channel;
   presenting media programs associated with the channels in the first segment in order in response to a first command;
   presenting the media programs associated with the channels in the second segment in order in response to a second command; and
   prioritizing the schedule of channels according to the duration of the time period during which each channel in the plurality of channels is tuned by the series of commands.

2. The method of claim 1, wherein:
   the step of determining a duration of a time period during which each channel in the plurality of channels is tuned comprises the step of determining a duration of a time period between each of the series of commands; and
   the step of prioritizing the schedule of channels according to a duration of a time period during which each channel in the plurality of channels is tuned comprises the step of prioritizing the channels according to a duration of a time period between each of the series of commands.

3. The method of claim 1, wherein the step of prioritizing the schedule of channels according to a duration of a time period during which each channel in the plurality of channels is tuned comprises the step of:

reordering the ordered schedule of channels according to the duration of the time period between each of the series of commands.

4. The method of claim 3, wherein the ordered schedule of channels is reordered after each command of the series of commands.

5. The method of claim 3, wherein the ordered schedule of channels is reordered after all of the channels of the schedule of channels has been tuned.

6. The method of claim 3, wherein the ordered schedule of channels is further ordered according to a time elapsed since the channel was last tuned.

7. The method of claim 3, wherein the step of reordering the ordered schedule of channels according to the duration of the time period between each of the series of commands further comprises the steps of:
weighting at least a portion of the time periods according to a time difference between a current time and a time when each channel in the plurality of channels associated with each time period was last tuned.

8. The method of claim 3, further comprising the step of:
reordering the reordered schedule of channels in sequential order.

9. The method of claim 8, wherein the step of reordering the ordered schedule of channels in sequential order is performed in response to a user command.

10. The method of claim 8, wherein:
each of the channels in the schedule of channels is associated with a media program; and
the step of reordering the reordered schedule of channels in sequential order is performed at a time associated with a change in a threshold number of the media programs associated with the channels in the schedule of channels.

11. The method of claim 1, further comprising the steps of:
de-prioritizing a selected channel in the schedule of channels in response to a user input.

12. The method of claim 1, wherein the ordered schedule of channels is a subset of all available channels.

13. An apparatus for computing a schedule of channels, comprising:
means for accepting channel surfing commands having a series of commands to tune a plurality of channels sequentially from an ordered schedule of channels;
means for determining a duration of a time period during which each channel in the plurality of channels is tuned by the series of commands;
means for determining which of the time periods exceeds a threshold time period;
means for segmenting the channels into a first segment having channels associated with a time period exceeding the threshold time period and a second segment having channels associated with a time period not exceeding the threshold time period;
means for ordering the channels in the first segment according to the duration of the time period associated with each channel in the plurality of channels, wherein the ordered schedule of channels is further ordered according a time elapsed since the channel was last tuned;
means for ordering the channels in the second segment according to the duration of the time period associated with each channel in the plurality of channels;
means for presenting media programs associated with the channels in the first segment in order in response to a first command;
means for presenting the media programs associated with the channels in the second segment in order in response to a second command; and
means for prioritizing the schedule of channels according to the duration of the time period during which each channel in the plurality of channels is timed by the series of commands, wherein the means for prioritizing the schedule of channels according to a duration of a time period during which each channel in the plurality of channels is tuned comprises means for reordering the ordered schedule of channels according to the duration of the time period between each of the series of commands.

14. The apparatus of claim 13, wherein:
the means for determining a duration of a time period during which each channel is tuned comprises means for determining a duration of a time period between each of the series of commands; and
the means for prioritizing the schedule of channels according to a duration of a time period during which each channel in the plurality of channels is tuned comprises means for prioritizing the channels according to a duration of a time period between each of the series of commands.

15. The apparatus of claim 13, wherein the ordered schedule of channels is reordered after each command of the series of commands.

16. The apparatus of claim 13, wherein the ordered schedule of channels is reordered after all of the channels of the schedule of channels has been tuned.

17. The apparatus of claim 13, wherein the means for reordering the ordered schedule of channels according to the duration of the time period between each of the series of commands further comprises:
means for weighting at least a portion of the time periods according to a time difference between a current time and a time when each channel associated with each time period was last tuned.

18. The apparatus of claim 13, further comprising:
means for reordering the reordered schedule of channels in sequential order.

19. The apparatus of claim 18, wherein the means for reordering the ordered schedule of channels in sequential order is performed in response to a user command.

20. The apparatus of claim 18, wherein:
each of the channels in the schedule of channels is associated with a media program; and
the means for reordering the ordered schedule of channels in sequential order reorders the ordered schedule of channels in sequential order at a time associated with a change in a threshold number of the media programs associated with at the channels in the schedule of channels.

21. The apparatus of claim 13, further comprising:
means for de-prioritizing a selected channel in the schedule of channels in response to a user input.

22. The apparatus of claim 13, wherein the ordered schedule of channels is a subset of all available channels.

23. An apparatus for computing a schedule of channels, comprising:
a user interface for accepting channel surfing commands having a series of commands to tune a plurality of channels sequentially from an ordered schedule of channels; and
a processor, communicatively coupled to a memory, the processor implementing a timer for determining a duration of a time period during which each channel in the plurality of channels is tuned and prioritizing the schedule of channels according to the duration of the time period during which each channel in the plurality of channels is tuned by the series of commands, wherein the processor;
determines which of the time periods exceeds a threshold time period, and segments the channels into a first segment having channels associated with a time period exceeding the threshold time period and a second segment having channels associated with a time period not exceeding the threshold time period;
orders the channels in the first segment according to the duration of the time period associated with each channel in the plurality of channels, and orders the channels in the second segment according to the duration of the time period associated with each channel in the plurality of channels; and
presents media programs associated with the channels in the first segment in order in response to a first command, and presents the media programs associated with the channels in the second segment in order in response to a second command.

24. The apparatus of claim 23, wherein:
the processor determines a duration of a time period during which each channel in the plurality of channels is tuned by determining a duration of a time period between each of the series of commands; and
the processor prioritizes the schedule of channels according to a duration of a time period during which each channel in the plurality of channels is tuned by prioritizing the channels according to a duration of a time period between each of the series of commands.

25. The apparatus of claim 23, wherein the processor prioritizes the schedule of channels according to a duration of a time period during which each channel in the plurality of channels is tuned by reordering the ordered schedule of channels according to the duration of the time period between each of the series of commands.

26. The apparatus of claim 25, wherein the ordered schedule of channels is reordered after each command of the series of commands.

27. The apparatus of claim 25, wherein the ordered schedule of channels is reordered after all of the channels of the schedule of channels has been tuned.

28. The apparatus of claim 25, wherein the ordered schedule of channels is further ordered according a time elapsed since the channel was last tuned.

29. The apparatus of claim 25, wherein the processor reorders the ordered schedule of channels according to the duration of the time period between each of the series of commands by weighting at least a portion of the time periods according to a time difference between a current time and a time when each channel associated with each time period was last tuned.

30. The apparatus of claim 25, wherein the processor further reorders the reordered schedule of channels in sequential order.

31. The apparatus of claim 30, wherein the processor recorders the ordered schedule of channels in sequential order in response to a user command.

32. The apparatus of claim 30, wherein:
each of the channels in the schedule of channels is associated with a media program; and
the processor reorders the ordered schedule of channels in sequential order at a time associated with a change in a threshold number of the media programs associated with at the channels in the schedule of channels.

* * * * *